J. H. RAMSEY.
FILM SPOOL FOR PHOTOGRAPHIC CAMERAS.
APPLICATION FILED MAY 10, 1917.
1,335,917.
Patented Apr. 6, 1920.
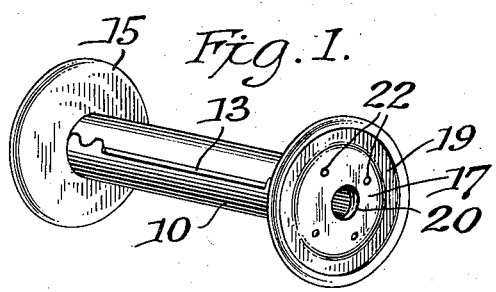
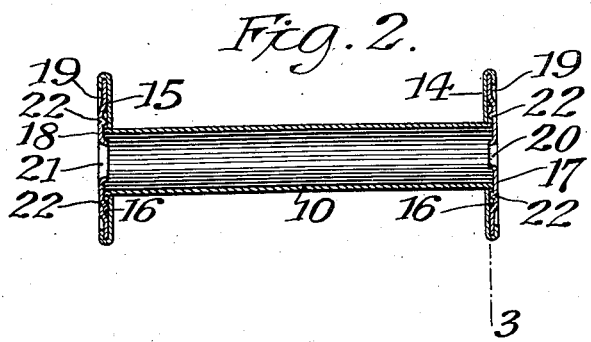
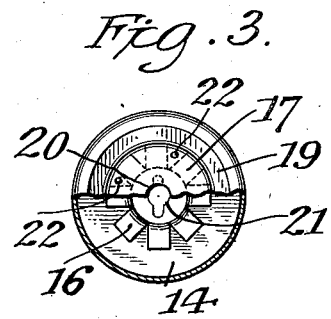
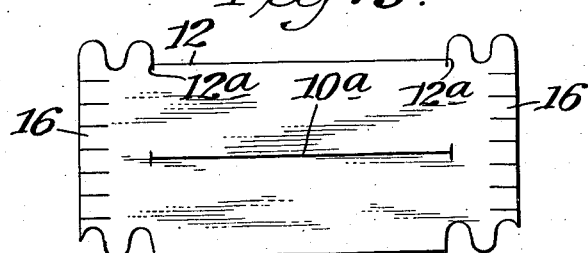
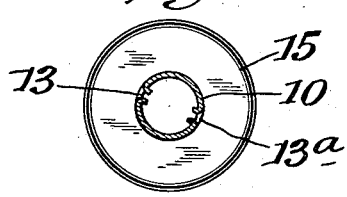
J. H. Ramsey,
Inventor,
By his Attorneys,
Kerr, Page, Cooper & Hayward

UNITED STATES PATENT OFFICE.

JOSEPH H. RAMSEY, OF ALBANY, NEW YORK.

FILM-SPOOL FOR PHOTOGRAPHIC CAMERAS.

1,335,917.      Specification of Letters Patent.      Patented Apr. 6, 1920.

Application filed May 10, 1917. Serial No. 167,635.

*To all whom it may concern:*

Be it known that I, JOSEPH H. RAMSEY, a citizen of the United States, residing at Albany, in the county of Albany and State of New York, have invented certain new and useful Improvements in Film-Spools for Photographic Cameras, of which the following is a full, clear, and exact description.

This invention relates to film reels or spools for photographic cameras, and its chief object is to provide a spool composed entirely of sheet metal, which can be manufactured at low cost and which shall possess the necessary strength and accuracy required in articles for the purpose. To this and other ends the invention consists in the novel features hereinafter described.

One form of the invention is illustrated in the annexed drawing, in which—

Figure 1 is a perspective view of my improved sheet-metal film-spool.

Fig. 2 is a longitudinal section of the same.

Fig. 3 is an end view of the spool, with the lower half of the nearer end in section on a plane indicated by the line 3 in Fig. 2.

Fig. 4 is a cross section on line 4—4 of Fig. 2.

Fig. 5 is a plan view of the blank from which the cylindrical shank of the spool is made.

The shank 10 of the spool is made from a blank $10^a$ of substantially rectangular form, with an elongated projection 11 on one of its longer edges and with a recess 12 of the same length on the opposite edge. The ends of the recess are slit back at each end, as indicated at $12^a$. The blank is bent to cylindrical form, with the projection 11 extending into the recess 12. Their edges are bent inwardly as shown in Fig. 4, thus forming a longitudinal slot 13, having stiffened or reinforced edges, to receive the paper film-backing in the usual way. The provision of the projection 11 eliminates any cracks or crevices that might be left in line with the slot, in which the paper might catch. In short, the slot so formed is completely closed at its ends and the tapered end of the film-backing can be inserted as far as it will go without possibility of its being caught in a crack at the end of the slot, which might interfere with accurate positioning of the film, causing it to wind on the spool unevenly. It is well known that if the film does not wind straight on the spool it is almost certain to jam to such an extent as to make turning of the spool impossible after a few sections of the film have been wound on it. If desired a slot $13^a$ may be provided opposite the first. For this purpose a longitudinal slit $13^b$ can be cut in the blank $10^a$, with end slits $13^c$ so that the lips or edges of the slit can be bent inwardly as shown in Fig. 4.

The cylindrical shank or core having been formed, the two centrally apertured inner end-disks 14, 15, are slipped over its ends, the apertures at the centers of the disks making a close fit with the tubular shank. The tongues 16, formed by slitting the ends of the blank $10^a$, are now bent radially outward to form abutments at the ends for the disks 14, 15 to rest against. The outer end-disks, 17, 18 are now placed on the ends of the spool and accurately centered thereon. These last-named disks have their peripheral portions depressed, as shown at 19, into the plane of the abutments formed by the tongues 16, and are provided one with a circular opening 20 and the other with an elongated opening or slot 21 to receive the film "centers" of the camera. These openings may be strengthened by bending their edges inwardly as shown in Fig. 2. To prevent rotation of the ends relatively to the shank when winding the film the outer disks may have one or more pressed lugs 22 to extend into the spaces between the tongues 16. The force exerted by the winding key of the camera upon the end of the spool when the same is in use may be sufficient to twist the core or shank, but this twist must be accompanied by longitudinal movement of one edge of the slot 13 relative to the other edge, as will be clear upon a little reflection. I therefore prefer to make edges of the blank $10^a$ at the ends of the recess 12 and projection or lip 11 serrated, so to speak, as indicated at $10^b$, so that the two will interlock, as it were, when the blank is rolled up to form the core of the spool. This affords greater resistance to the aforesaid longitudinal movement of the slot-edges and hence diminishes the liability of torsional strain. The edge-portions of the inner disks 14, 15, are bent inwardly over the edges of the outer disks, locking the disks together upon the abutments. The spool is then structurally complete.

The metal of the abutments 16, inner disks 14, 15, and the outer disks 17, 18, being of the same thickness, the edges of the outer faces of the spool-ends are flush with the central portions thereof so that my improved sheet-metal spool will fit the camera as smoothly and evenly as do the best of the present wooden-shank spools. The inner surfaces of the ends are perfectly smooth, so that the edges of the film-backing paper can not catch thereon but will wind up smoothly and regularly. There is also no possibility of light-leakage through the ends of the spool, even when the abutments at the ends of the shank are formed by tongues such as 16, since the angular spaces between the tongues are effectually closed by the outer and inner disks.

The parts are stamped out of sheet metal and the other operations described can be cheaply performed by automatic or semi-automatic machines, but as the latter form no part of the present invention they are not described herein.

It is to be understood that the invention is not limited to the specific details of construction herein described but can be embodied in other forms without departure from its spirit as defined by the following claims.

I claim:—

1. A film-spool for photographic cameras, comprising a tubular shank of sheet metal having radially extending abutments at its ends, outer end-disks of sheet metal on the ends of the shank and having their outer edge-portions depressed into the planes of said abutments and extending at right angles to the shank, and inner end-disks of sheet metal on the shank at the ends thereof and having their edge-portions bent radially inward over the edges of the outer disks.

2. A film-spool for photographic cameras, comprising a tubular shank composed of a sheet metal blank of rectangular form having on one edge a projection and on the opposite edge a recess of like length but less depth, the blank being bent to tubular form and having the said projection extending into the said recess to leave a closed-end slot for the end of the film-backing, the shank at its ends having radially extending abutments; and sheet metal end-disks locked upon said abutments and held thereby against axial displacement.

3. A film-spool for photographic cameras, comprising a tubular shank composed of a sheet-metal blank of rectangular form, having on one of its longer edges an elongated projection and in the opposite edge a recess of like length but less depth, the blank being bent to tubular form and having the said projection extending into the said recess to leave a closed-end slot for the end of the film-backing, the end-portions of the sheet metal shank being bent radially outward to form abutments; outer end-disks of sheet metal having their edge-portions depressed into the plane of said abutments and having central apertures for the film-centers of the camera, and having means engaging the abutments to prevent rotation of said disks relative to the shank; and inner-end disks of sheet metal having their edge-portions bent over, and inwardly upon, the edges of the outer disks whereby the inner and outer disks are locked together upon the abutments.

4. In a film-spool for photographic cameras, comprising a tubular shank of sheet metal having radial outwardly extending tongues at its end constituting abutments; an inner end-disk of sheet metal, having a central aperture closely fitting the shank, and arranged flat against the inner surface of the radial abutments; an outer, centrally apertured end-disk of sheet metal arranged flat against the outer surface of the abutments; the extreme outer edge of one of said end-disks being bent inwardly over and upon the adjacent outer edge of the other disk to hold both disks in position with the abutments between the two and prevent the passage of light between the abutments.

5. The film-spool described in claim 4, in which one of the end-disks is provided with lugs extending between the abutments to prevent rotation of the disk relatively to the shank.

In testimony whereof I affix my signature.

JOSEPH H. RAMSEY.